Aug. 31, 1948.  W. R. BONHAM  2,448,249

VARIABLE SPEED TRANSMISSION

Filed Aug. 31, 1946

INVENTOR.
WALTER R. BONHAM
BY
J. E. Trabucco
ATTORNEY.

Patented Aug. 31, 1948

2,448,249

UNITED STATES PATENT OFFICE 2,448,249

VARIABLE-SPEED TRANSMISSION

Walter Richard Bonham, Palo Alto, Calif.

Application August 31, 1946, Serial No. 694,376

3 Claims. (Cl. 74—189.5)

This invention relates to automatic variable speed transmissions of the type adapted for use with automotive vehicles.

An object of my invention is to provide a novel variable ratio drive mechanism employing a fluid coupling and a planetary gear system.

Another object of my invention is to provide an automatic variable ratio drive mechanism for transmitting power from a drive shaft to a driven shaft, embodying a fluid coupling having its impeller rigidly connected to the drive shaft and its runner connected to the driven shaft through a planetary gear system which is capable of being selectively controlled to effect the rotation of the driven shaft either in the same direction the drive shaft is rotating or in a reverse direction.

Another object of my invention is to provide a variable speed transmission of the kind which will automatically and progressively adjust itself to the driving conditions and the engine load without the use of manually operable gear shifting or clutch means.

Other and further objects of my invention will be pointed out hereinafter, or will be indicated in the appended claims, or will be obvious to one skilled in the art upon an understanding of the present disclosure. For the purpose of this application I have elected to show herein certain forms and details of a variable speed transmission representative of my invention; it is to be understood, however, that the embodiment of my invention herein shown and described is for the purpose of illustration only and that therefore it is not to be regarded as exhaustive of the variations of the invention.

Figure 1:
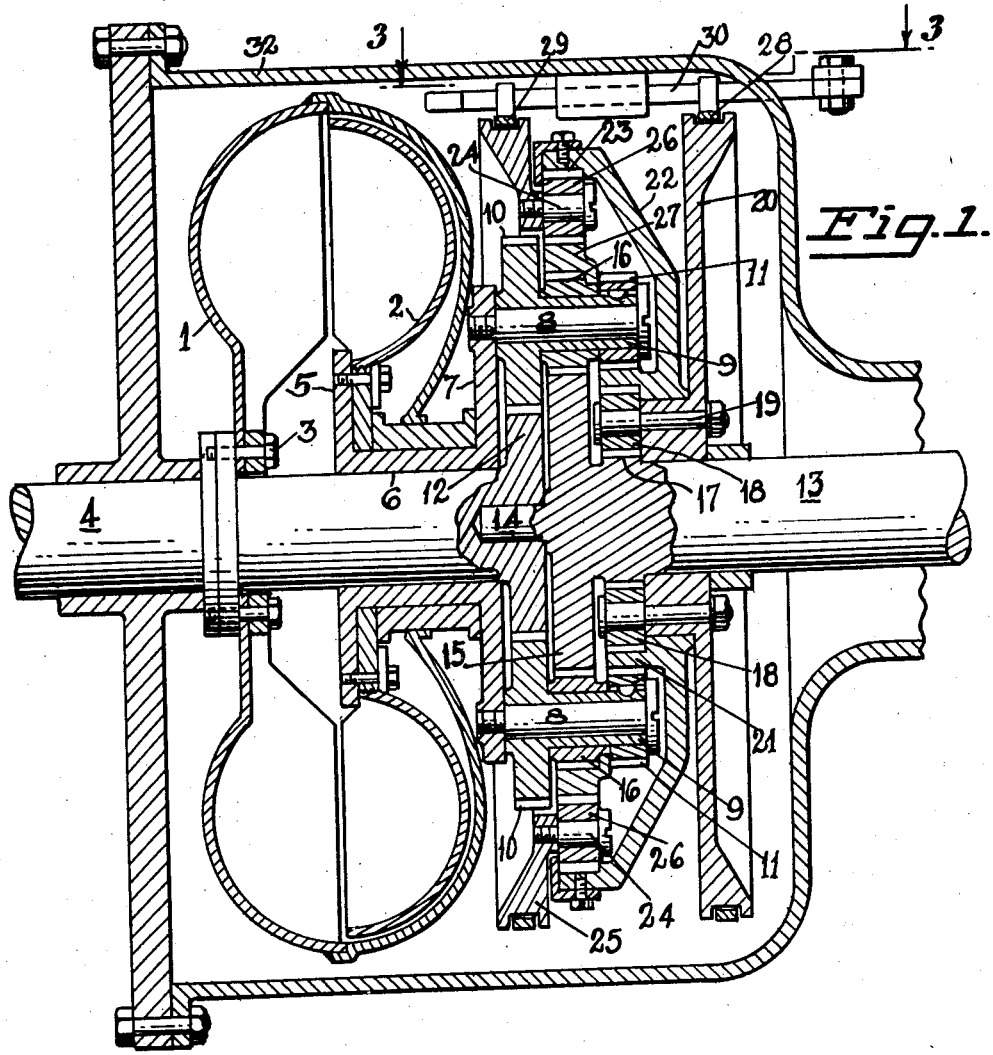
Figure 1 is a vertical longitudinal sectional view of a variable speed transmission embodying the principles of my invention.
Figure 2:
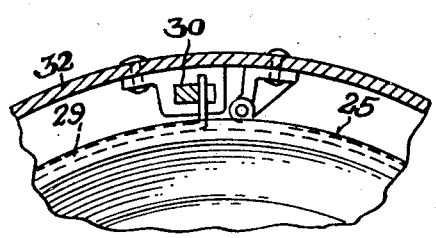
Figure 2 is a sectional view of a fragmentary part of the control means associated with the transmission.

The fluid coupling selected for illustration purposes is well known in the art to which the present invention relates and requires no detailed description, it being sufficient for purposes of this specification to state that it comprises a vaned impeller 1 positioned in opposed relation to a vaned runner 2. The impeller 1 is suitably secured as at 3 to the driving shaft 4 of an engine and is rotated thereby. The runner 2 is bolted to an outwardly extending annular flange 5 formed at one end of a sleeve 6 which is rotatably mounted on the driving shaft 4. The sleeve 6 is formed at its opposite end with a carrier 7 having a plurality of uniformly spaced spindles 8 secured thereto.

Rotatably mounted on each of the spindles 8 is a tubular shaft 9 having a planet gear 10 fixed to one end thereof and another smaller gear 11 keyed to its opposite end. The driving shaft 4 carries a sun gear 12 which operatively engages with the planet gears 10.

The driven shaft 13 is piloted as at 14 in the inner right hand end of the driving shaft 4, and secured rigidly to the former's inner or left hand end is a sun gear 15 which cooperates with a plurality of planet gears 16 rotatably mounted on the tubular shafts 9. The driven shaft 13 carries another but smaller gear 17 which cooperatively engages with a plurality of planet pinions 18, each of said planet pinions being rotatably mounted on individual shafts 19 supported on the hub portion of a disc-like carrier 20.

Cooperating with and interposed between the pinions 18 and the small gears 11 is a ring gear 21 having internal and external teeth, the said ring gear being carried by the hub portion of a connecting web 22. The connecting web 22 is rotatably mounted on the hub portion of the carrier 20. Carried at the periphery of the web 22 is an internal ring gear 23 which constitutes an orbit for a planetary gear train. Rotatably mounted on shafts 24 secured to a ring-shaped carrier 25 are planet gears 26 which operatively engage with a ring gear 27 having teeth provided internally and externally thereon. The ring gear 27 operatively engages internally with the gears 16 rotatably mounted on the tubular shafts 9.

Figure 3:
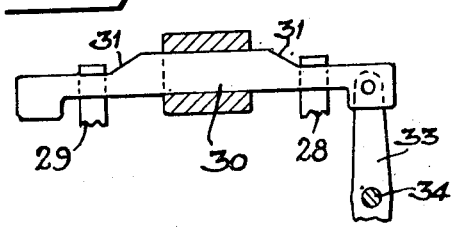
Figure 3 is another sectional view of the control means, taken substantially along the line 3—3 of Figure 1.

Cooperating with the disc-like carrier 20 and the ring-shaped carrier 25, respectively, are brake bands 28 and 29, which when tightened will hold their respective carriers against rotation. Suitable means, operable preferably from the driver's seat of the vehicle, is provided for selectively bringing either of the brake bands into operative relationship with its associated carrier. Since either one or the other of the carriers 20 or 25 is held stationary while the other is rotating, depending upon whether forward or reverse motion is to be imparted to the vehicle, it is necessary to bring one of the brake bands into operative engagement with its associated carrier while the other is disengaged from its associated carrier. A shiftable bar 30 having oppositely inclined surfaces 31 arranged thereon, is mounted on the housing 32 in cooperative relationship with the brake bands 28 and 29. A lever 33, pivoted at 34 and connected to one end of the shiftable bar 30, when moved to the left (Figure 3) will contact the brake band 29 and cause its firm engagement with the carrier 25, and when shifted to the right will release the band 29 and at the same time contract the band 28 to stop the rotation of the carrier 20. When the transmission is in neutral neither brake band is contracted, and both carriers 20 and 25 rotate freely.

In operation, the drive from the engine is directly transmitted by the driving shaft 4 to the gear 12 which is thereby rotated to cause the planet gears 10 and the small gears 11 to rotate.

Until either of the carriers 20 and 25 are held stationary, the driven shaft 13 is free of driving connection with the driving shaft 4. At low speeds the tendency of the carrier 7, the runner and the gear assembly is to rotate in a direction opposite to that of the driving shaft, this being due to the fact that the slip in the fluid coupling is substantially one hundred percent and practically no driving force is being transmitted from the impeller to the runner. With an increase in the engine torque the runner 2 discontinues its reverse rotation and begins to rotate with the impeller, thereupon transmitting drive to the carrier. By applying the brake band 29 and preventing the rotation of the ring-shaped carrier 25 driving torque in the direction of the driving shaft 4 is transmitted to the driven shaft through the carrier 7, the tubular shafts 9, the small gears 11, the ring gear 21, the web 22, the ring gear 23, the planet gears 26, the ring gear 27, the planet gears 16 and the sun gear 15. It will be noted that such rotation of the carrier 7 automatically and progressively decreases the reduction gear ratio until the fluid coupling is operating with its minimum slip and the total reduction ratio is a minimum.

Reverse is obtaned by shifting the bar 30 to a position whereby the brake band 29 is released from engagement with its associated carrier 25 and the brake band 28 is contracted about the carrier 20 to prevent the latter's rotation. With the carrier 25 again conditioned for free rotation the driving connection between ring gear 23, the planet gears 26 and the ring gear 27 is discontinued and the said carrier freely rotates about the said ring gear 27 without imparting rotary motion thereto. With the carrier 20 secured against rotation the reverse drive of the driven shaft 13 is effectuated from the carrier 7, through the tubular shafts 9, the small gears 11, the ring gear 21, the planet pinions 18 and the gear 17.

The transmission automatically adjusts itself to the engine load, and since gear shifting is entirely eliminated its operation is silent and smooth.

What I claim is:

1. An automatic variable-ratio drive mechanism comprising driving and driven shafts, a fluid coupling including an impeller and runner, said impeller secured to the driving shaft, a carrier mounted for rotation about the driving shaft and connected in driving relationship with the runner of the fluid coupling, a sun gear secured to the driving shaft, a plurality of rotatable elements carried by the carrier and arranged in operative relationship with the said sun gear, a ring gear operatively engaging with the rotatable elements, a gear train adapted to connect the ring gear and the driven shaft and arranged to rotate the driven shaft in a forward direction, a second gear train connecting the ring gear and the driven shaft and arranged to rotate the driven shaft in a reverse direction, and means for selectively controlling the operation of the two gear trains, whereby the driven shaft may be rotated in either direction.

2. An automatic variable-ratio drive mechanism comprising driving and driven shafts, means for coupling the shafts including a mechanical means and a fluid power transmitting means, common rotatable means connected to both the mechanical means and the fluid power transmitting means, a plurality of sun gears carried by the driven shaft, a gear train adapted to connect the rotatable means and one of the sun gears of the driven shaft for rotating the driven shaft in a certain direction, and a second gear train operatively connecting the rotatable means and the other of the sun gears of the driven shaft for rotating the driven shaft in the opposite direction, and control means for selectively operatively connecting either of the gear trains with the driven shaft.

3. An automatic variable-ratio drive mechanism comprising driving and driven shafts, a fluid coupling including an impeller and a runner, said impeller secured to the driving shaft, rotatable means connected both to the runner of the fluid coupling and to the driving shaft, a sun-and-planet and ring gear combination connecting the rotatable means and the driven shaft for forward driving, a second sun-and-planet and ring gear combination connecting the rotatable means for reverse driving, and control means for selectively bringing either of the said gear combinations into or out of operative driving relationship with the driven shaft.

WALTER RICHARD BONHAM.

REFERENCES CITED

The following references are of record in the file of this patent:

UNITED STATES PATENTS

| Number | Name | Date |
|---|---|---|
| 2,106,423 | Lavaud | Jan. 25, 1938 |
| 2,284,934 | Watson | June 2, 1942 |
| 2,311,150 | Buraczynski | Feb. 16, 1943 |
| 2,349,642 | Watson | May 13, 1944 |
| 2,416,311 | Hanson | Feb. 25, 1947 |